(12) United States Patent
Cruickshank et al.

(10) Patent No.: US 10,106,924 B2
(45) Date of Patent: Oct. 23, 2018

(54) METHOD FOR IMPROVING WASHING MACHINE PERFORMANCE

(71) Applicant: The Procter & Gamble Company, Cincinnati, OH (US)

(72) Inventors: Graeme Duncan Cruickshank, Newcastle-upon-Tyne (GB); Vladimir Murashov, Darlington (GB); Nicolas Remy Denis Joseph Pochart, Brussels (BE); Andrew John Smith, Newcastle-upon-Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/139,789

(22) Filed: Apr. 27, 2016

(65) Prior Publication Data
US 2016/0312396 A1    Oct. 27, 2016

(30) Foreign Application Priority Data

Apr. 27, 2015   (EP) .................................... 15165233
Aug. 6, 2015    (WO) ....................... EP2015/068207

(51) Int. Cl.
*D06F 39/00*         (2006.01)
*D06F 35/00*         (2006.01)
(Continued)

(52) U.S. Cl.
CPC ............ *D06F 39/005* (2013.01); *D06F 33/02* (2013.01); *D06F 35/006* (2013.01); *G06F 3/04847* (2013.01); *D06F 2058/2883* (2013.01); *D06F 2202/12* (2013.01); *D06F 2204/02* (2013.01); *D06F 2204/06* (2013.01); *D06F 2204/08* (2013.01); *D06F 2216/00* (2013.01); *D06F 2220/00* (2013.01); *G05B 13/021* (2013.01); *G06F 3/0481* (2013.01)

(58) Field of Classification Search
CPC .... D06F 35/005; D06F 33/029; D06F 39/005; D06F 33/02; D06F 2058/2883; D06F 2216/00; G06F 3/0484; G06F 3/04847; G05B 13/021
USPC .......................................................... 8/158
See application file for complete search history.

(56) References Cited

U.S. PATENT DOCUMENTS 7,246,395 B2 *  7/2007  Buckroyd ............. D06F 39/005
                                                 68/12.27
2001/0049846 A1  12/2001  Guzzi et al.
(Continued)

FOREIGN PATENT DOCUMENTS

DE    102008042290 A1 *  3/2010  ......... A47L 15/0021
EP        0844326 A1     5/1998
WO    WO 2004055256 A1 *  7/2004  ........... D06F 39/003

OTHER PUBLICATIONS

International Search Report for International Application Serial No. PCT/EP2015/068207, filed Aug. 6, 2015, 8 pages.

*Primary Examiner* — Joseph L. Perrin
*Assistant Examiner* — Kevin G Lee
(74) *Attorney, Agent, or Firm* — Gary J. Foose

(57) ABSTRACT

A method for controlling the performance of a washing machine wash cycle wherein the wash cycle uses a set of wash cycle parameters, the method including receiving feedback of one or more previous wash cycles, adjusting a subset of the set of wash cycle parameters responsive to the feedback and outputting consequences of said adjusting.

6 Claims, 4 Drawing Sheets

(51) Int. Cl.
    *G06F 3/0484*     (2013.01)
    *D06F 33/02*      (2006.01)
    G06F 3/0481       (2013.01)
    D06F 58/28        (2006.01)
    G05B 13/02        (2006.01)

(56) References Cited

U.S. PATENT DOCUMENTS

| | | | |
|---|---|---|---|
| 2003/0154560 A1 | 8/2003 | Behrens et al. | |
| 2004/0134238 A1* | 7/2004 | Buckroyd | D06F 39/005 68/12.23 |
| 2006/0156764 A1* | 7/2006 | Baggio | D06F 39/005 68/12.02 |
| 2006/0253800 A1* | 11/2006 | Jones | G06Q 30/02 715/810 |
| 2013/0311901 A1* | 11/2013 | Francois | G06F 3/0484 715/753 |
| 2017/0139379 A1* | 5/2017 | Scheckelhoff | G05B 13/021 |

* cited by examiner

METHOD FOR IMPROVING WASHING MACHINE PERFORMANCE

FIELD OF THE INVENTION

The invention relates to a method for controlling and optimising the performance of a washing machine wash cycle using a set of wash cycle parameters

BACKGROUND OF THE INVENTION

Washing machines typically comprise a set of pre-programmed settings, which may be available to the user via push buttons, one or more rotary adjustable dials, a touch screen, or a combination thereof. Sometimes, these pre-programmed settings can be further tailored by allowing the possibility to modify certain parameters such as temperature or spin speed, or by adding an extra cycle, such as an extra rinse cycle or an extra pre-wash cycle.

However, the user usually does not know what kind of pre-programmed setting or combination of settings will yield the exact results they wish to achieve. Furthermore, even though the pre-programmed settings can often be further modified, the user lacks the technical knowledge to predict what exact modifications need to be made. Washing machine manufacturers try to guide the user by using easily understandable key-words or pictograms for the pre-programmed setting, such as "whites" and "delicates", and by providing additional information in the manual. However, most users tend to get lost in the complicated options and the sheer number of combinations possible, and typically only use a very limited number of settings they feel comfortable with. In situations when the wash cycle proves to be unsatisfactory, the user typically restarts the wash cycle using the same setting.

In addition, sometimes the user will wish to change the wash cycle in ways that may not be possible, or which may not be directly achievable. For example, the user may wish to use less water for environmental or drought reasons, while maintaining a certain degree of cleanliness. Alternatively, the user may be in a rush, and may need an item of laundry to be washed more quickly.

In some cases, the user will have certain batches of laundry that occur regularly, such as bed linen, or a football kit. These batches of laundry will have optimal settings for the washing machine, but it is often too complicated for the user to derive these settings. Remembering the specific settings afterwards is usually practically impossible.

In the prior art, DE102008042290 A1 describes a household appliance that can receive a user-assessment of a previous process and modify subsequent process to match specific user-profiles and expectations. US 2001/0049846 A1 describes a washing machine that can receive user-inputted information about each garment to optimise a wash, and after a wash can receive a user rating in respect of the laundering results.

There is a need for washing machines and methods for controlling the washing machine that allow a user to obtain the desired results for each batch of laundry without the need to know or remember the technical details behind the pre-programmed settings and inner workings of the washing machine and to select these easily on the machine.

SUMMARY OF THE INVENTION

The present invention aims to overcome one or more of the problems described above.

The present invention relates to a method for controlling the performance of a washing machine wash cycle using a set of wash cycle parameters, the method comprising
receiving (208) feedback regarding the results of one or more previous wash cycles,
adjusting (212) a subset of the set of wash cycle parameters responsive to the feedback,
outputting consequence information (218) regarding consequences of said adjusting,
receiving further feedback (220) responsive to the consequence information (218), and
readjusting (224) the subset of the set of wash cycle parameters responsive to the further feedback (220).

The feedback (208) may comprise input regarding one or more feedback parameters, the consequence information (218) may comprises at least some of the one or more feedback parameters and a value assigned to each feedback parameter, and the further feedback (220) may comprise an adjustment to the value of a feedback parameter of the consequence information (218).

The consequence information (218) may be outputted to a graphical user interface module wherein each feedback parameter thereof is an adjustable dial (162-167) indicating the value of the feedback parameter the further feedback (220) is received by adjustment of one or more of the adjustable dials (162'-167'), at least two dials are synchronised, such that an indication of the value of a second dial (164'-167') changes responsive to an input of an adjustment to a first dial (163, 163').

The method may further comprise the step of updating the consequence information and outputting it to the user (226, 218) after the step of receiving further feedback (220) responsive to the consequence information (218).

The steps of receiving further feedback (220) responsive to the consequence information (218), and updating the consequence information and outputting it (226, 218), may be repeated at least once.

One or more of the feedback parameters of the consequence information may include stain removal, fragrance, residue, whiteness, ironability, wetness, length of cycle, colour fading, care, energy consumption or water consumption.

One of the feedback parameters of the consequence information is energy consumption or water consumption or cycle length, and optionally another of the feedback parameters of the consequence information relates to laundered garment characteristic such as stain removal, fragrance, residue, whiteness, ironability, wetness, colour fading, or care.

The subset of wash cycle parameters and the adjustment thereof may be determined using a set of rules, each rule linking one or more wash cycle parameters with one or more feedback parameters, and the consequence information may be determined using a set of relationship formulas each relationship linking to a feedback parameter to another feedback parameter.

The method may further comprise the step of outputting guidance information responsive to the feedback.

According to one aspect,
a. the set of wash cycle parameters comprises one or more wash cycle parameters each having a value;
b. the wash cycle parameters present in the subset of wash cycle parameters are determined by a set of rules;
c. feedback comprises one or more feedback parameters each having a qualitative or quantitative value;

d. the adjusting the subset of wash cycle parameters comprises changing the values of wash cycle parameters in the subset according to the set of rules;
e. the consequence information comprises at least some of the one or more feedback parameters of step c) and the values thereof, and
f. the set of rules contains a plurality of rules, each rule linking one or more wash cycle parameters with one or more feedback parameters, and optionally with one or more sensor parameters.

The present invention also relates to a method for controlling the performance of a washing machine wash cycle using a set of wash cycle parameters, the method comprising receiving feedback from a user of one or more previous wash cycles, and adjusting a subset of the set of wash cycle parameters responsive to the feedback.

The feedback may comprise input on one or more feedback parameters selected from the group comprising: stain removal, fragrance, residue, whiteness, ironability, wetness, length of cycle, energy consumption, water consumption, and colour fading.

The subset of wash cycle parameter may comprise one or more wash cycle parameters selected from the group comprising: number of pre-washes, main washes, intermediate rinses, level of water in a prewash, main wash, intermediate rinse, and/or final rinse, detergent quantity and/or detergent type in a prewash, main wash, or intermediate rinse, overall agitation time in a prewash, main wash, intermediate rinse and/or final rinse, agitation temperature in a prewash, main wash, intermediate rinse and/or final rinse, agitation frequency in a prewash, main wash, intermediate rinse and/or final rinse, agitation duration in a prewash, main wash, intermediate rinse and/or final rinse, agitation drum speed, overall draining time in a prewash, main wash, intermediate rinse and/or final rinse, overall spin time in a prewash, main wash, intermediate rinse and/or final rinse, overall spin speed in a prewash, main wash, intermediate rinse and/or final rinse, overall rocking time in a final rinse, rocking frequency in a final rinse, rocking duration in a final rinse. The subset of wash cycle parameters may comprise one or more wash cycle parameters for a specific stage, wherein the stage is selected from the group comprising: prewash, main wash, intermediate rinse, final rinse.

The subset of wash cycle parameters and the adjustment thereof may be determined using a set of rules, each rule linking one or more wash cycle parameters with one or more feedback parameters.

The method may further comprise after adjusting the subset of the set of wash cycle parameters responsive to the feedback, outputting information regarding consequences of said adjusting, receiving further feedback, and readjusting the subset of the set of wash cycle parameters responsive to the further feedback.

The feedback may be received via a graphical user interface module integrated into the washing machine and/or provided graphical user interface integrated in a separate Internet connected device.

The method may further comprise receiving washing machine sensor information prior to starting or during the washing machine cycle, and adjusting one or more wash cycle parameters responsive to the sensor information.

The sensor information may comprise one or more sensor parameters from the group comprising: load weight, load absorbency, water volume to wet load, heat up rate, foam generation, rinse quality, and waste water turbidity.

The method may further comprise the step of providing the user with guidance information responsive to the feedback.

The set of wash cycle parameters comprises one or more wash cycle parameters each having a value; the wash cycle parameters present in the subset of wash cycle parameters may be determined by a set of rules; the feedback may comprise one or more feedback parameters each having a qualitative or quantitative value; the adjusting the subset of wash cycle parameters may comprises changing the values of wash cycle parameters in the subset according to the set of rules; and the set of rules may contain a plurality of rules, each rule linking one or more wash cycle parameters with one or more feedback parameters, optionally with one or more sensor parameters.

The method may further comprise the step of saving the set of wash cycle parameters comprising the adjusted subset of wash cycle parameters as a customised wash cycle, wherein the customised wash cycle is optionally further adjustable using a method as described herein.

The invention also relates to a computer program stored on a computer-readable medium, configured to perform a method as described herein. The invention also relates to a washing machine configured to implement a method as described herein.

DETAILED DESCRIPTION OF THE INVENTION

Figure 1:
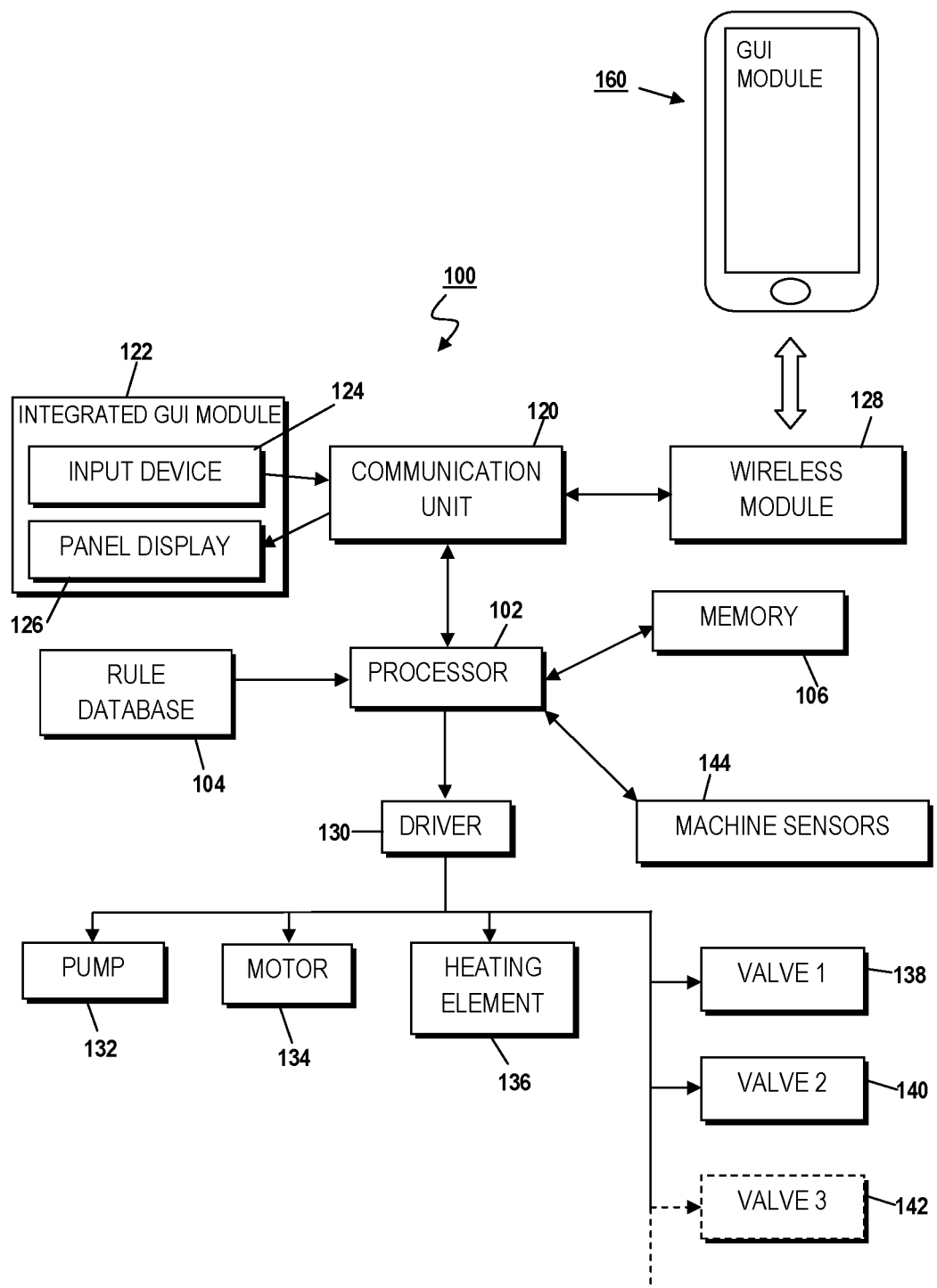
FIG. 1 depicts a block diagram of a washing machine according to an embodiment of the invention.

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and the include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

It is to be understood that other embodiments may be utilised and structural or logical changes may be made without departing from the scope of the present invention. The following detailed description, therefore, is not to be taken in a limiting sense, and the scope of the present invention is defined by the appended claims.

The present invention relates to a method of controlling and optimising the performance of a washing machine cycle, and a washing machine to perform a method of the invention. The method comprises receiving feedback from a user of the results of one or more previous wash cycles and adjusting a subset of wash cycle parameters responsive to the feedback. The inventors have found that a typical user does not exploit the capabilities of a washing machine, due to a lack of understanding of the cycle, and its complexity. The present invention provides a method and washing machine that receives feedback from the user concerning the last cycle (or a selected previous cycle) and adjusts wash cycle parameters for a future wash thereby allowing an improved wash cycle without the requirement for technical understanding of the machine and interplay of possible adjustable parameters. The feedback information may be received via a graphical user interface (GUI) module that may be integrated into the washing machine or implemented using a connected device such as a smartphone or tablet.

The feedback comprises an input in regard of one or more feedback parameters. The feedback comprises a selection of a parameter and optionally a value associated with the parameter. The feedback may comprise the selection of one or more parameters that is an explicit or implicit indication of dissatisfaction. For instance, selection of "fragrance" may be an implicit indication of that the level of garment fragrance is insufficient. Optionally, a level may be inputted associated with the selected parameter, for example a level may be inputted using a sliding scale or plus/minus buttons. The user may be provided with a selectable list of feedback parameters. In an example, after completion of a wash cycle the user may be asked to input feedback on dissatisfaction with fragrance and ironability of the laundered garments. By selecting "fragrance", for instance, the feedback comprises dissatisfaction with the fragrance level, any remaining malodour in the garments, for example related to sweat on sports garments, and the method adjusts the subset of wash cycle parameters to increase fragrance in a subsequent wash cycle. By selecting "ironability", for instance, the feedback comprises dissatisfaction with the ironability level, and the method adjusts the subset of wash cycle parameters to increase ironability in a subsequent wash cycle. Feedback may be provided using the graphical user interface (GUI) module described later below. The feedback may be qualitative feedback (for example, satisfactory/unsatisfactory fragrance) or quantitative feedback (for example, cleanliness evaluated on a scale from 1 to 10).

The method may output information (to the user) concerning consequences of the adjustments to the subset of the set of wash cycle parameters. The method may allow the user to provide additional feedback responsively, and update the consequences. According to one embodiment each feedback parameter in the selectable list of feedback parameters is provided as a linear or rotary adjustable dial; the movements of at least two dials may be synchronised. By using such synchronised adjustable dials, it is one way for the consequences of the feedback and adjustments to become apparent.

Examples of user feedback parameters include stain removal, fragrance, residue, whiteness, ironability, wetness, length of cycle, colour fading, care, energy consumption and water consumption.

Responsive to the feedback, the method adjusts a subset of wash cycle parameters with an aim to improve feedback in a subsequent wash cycle. As used herein, the term "wash cycle parameter" refers to any adjustable parameter that a washing machine may or may not use during a wash cycle. As used herein, the term "set of wash cycle parameters" refers to the wash cycle parameters that are actually used by the washing machine during the selected wash cycle. As used herein, the term "subset of wash cycle parameters" refers to the wash cycle parameters selected from the set of wash cycle parameters that are adjusted according to the method of the invention; this is also sometimes referred to as the subset of the set of wash cycle parameters. The subset of wash cycle parameters will be smaller or equal to the set of wash cycle parameters.

In the art, a wash cycle typically comprises 3 principal stages: a main wash, an intermediate rinse, and a final rinse. An optional pre-wash stage may precede the main wash stage. Within each stage there may be a plurality of phases: a filling phase where water, optionally with detergent, enters the drum to a level; an agitation phase where the drum rotates to agitate the garments; a draining phase where contaminated water is pumped from the drum; and a spin phase where the garments are spin-dried in the drum. Examples of adjustable parameters are provided in Table 1, together with exemplary codes.

TABLE 1

Examples of adjustable parameters for a wash cycle.

| STAGE | PHASE | WASH CYCLE PARAMETER | CODE |
|---|---|---|---|
| Prewash (optionally with detergent) | Filling | Number of pre-washes | PN1 |
|  |  | Water level | PF1 |
|  |  | Detergent quantity | PF2 |
|  |  | Detergent type | PF3 |
|  | Agitation | Overall time | PA1 |
|  |  | Temperature | PA2 |
|  |  | Agitation frequency | PA3 |
|  |  | Agitation duration | PA4 |
|  |  | Drum speed | PA5 |
|  | Draining | Overall time | PD1 |
|  | Spin | Overall time | PS1 |
|  |  | Speed | PS2 |
| Main wash (parameters may differ for each main wash) | Filling | Water level | MF1 |
|  |  | Detergent quantity | MF2 |
|  |  | Detergent type | MF3 |
|  |  | Laundry additive | MF4 |
|  | Agitation | Overall time | MA1 |
|  |  | Temperature | MA2 |
|  |  | Agitation frequency | MA3 |
|  |  | Agitation duration | MA4 |
|  |  | Drum speed | MA5 |
|  | Draining | Overall time | MD1 |
|  | Spin | Overall time | MS1 |
|  |  | Speed | MS2 |
| Intermediate rinse (parameters may differ for each rinse) |  | Number of rinses | IN1 |
|  | Filling | Water level | IF1 |
|  |  | Detergent quantity | IF2 |
|  |  | Detergent type | IF3 |
|  | Agitation | Overall time | IA1 |
|  |  | Temperature | IA2 |
|  |  | Agitation frequency | IA3 |
|  |  | Agitation duration | IA4 |
|  |  | Drum speed | IA5 |
|  | Draining | Overall time | ID1 |
|  | Spin | Overall time | IS1 |
|  |  | Speed | IS2 |
| Final rinse (Rinse added products) | Filling | Water level | FF1 |
|  |  | Rinse added product(s) | FF2 |
|  | Agitation | Overall time | FA1 |
|  |  | Temperature | FA2 |
|  |  | Agitation frequency | FA3 |
|  |  | Agitation duration | FA4 |
|  |  | Drum speed | FA5 |
|  | Draining | Overall time | FD1 |
|  | Spin | Overall time | FS1 |
|  |  | Speed | FS2 |
|  | Rocking | Overall time | FR1 |
|  |  | Rocking frequency | FR2 |
|  |  | Rocking duration | FR3 |

In some embodiments, the subset of wash cycle parameters that are adapted include the number of rinses or level of water in a final rinse, the number of pre-washes and number of intermediate washes. In some embodiments, the subset of wash cycle parameters that are adapted parameters that define the order of the stages. For example, a second pre-wash wash may be added after a first pre-wash and before main wash.

The detergent quantity (PF2, MF2, IF2), quantity of added rinse product(s) (FF2), quantity of laundry additive (MF4) may be controlled automatically for instance, by employing a detergent storage reservoir and a dosing mechanism in the washing machine. Alternatively, they may be controlled manually by prompting the user to add a certain quantity. The detergent type (PF3, MF3, IF3) refers to the composition of the detergent, for instance, it might refer to the form of the detergent (e.g. powder, liquid, gel, tablet, capsule); additionally or alternatively, it might refers to the purpose of the detergent (e.g. cleaning whites, cleaning colours, cleaning dark colours). The detergent type may be controlled automatically by employing, for instance, multiple reservoirs, one for each detergent type selectable using an array of valves, or controlled manually by instructing the user. The detergent is typically understood to contain substances to facilitate principally cleaning of the clothes. The rinse added product(s) is understood to be an enhancer, for instance, of softness or fragrance (e.g. fabric conditioner). The laundry additive is any other substance added in the main wash beside the detergent, such as stain removal booster, fragrance booster.

Depending on the cycle selected by the user, the method populates the set of wash cycle parameters with standard starting values. For instance, a "Normal" cycle may set the temperature parameters PA2, MA2, IA2, FA2 to a maximum of 40 deg Celsius, while a "Hygiene" cycle may set the temperature parameters PA2, MA2, IA2, FA2 to a maximum of 60 deg Celsius. Once the feedback is received for a particular cycle, a subset of the set of wash cycle parameters may be adjusted by the method. The adjusted parameters may be present in one or more of the phases.

The wash cycle may be selected from a list of available wash cycles using a graphical user interface (GUI) module. Exemplary wash cycles are listed in Table 2 below, together with some explanation of each wash title.

TABLE 2

Exemplary machine wash cycles.

| WASH CYCLE | COMMENT |
|---|---|
| Normal | For most fabrics, including cotton, synthetics and normally soiled garments |
| Heavy duty | For garments of strong fabrics, colourfast and heavily soiled |
| Hygiene | For colourfast and heavily soiled garments, heats to 65 deg C. for hygienic cleaning |
| Stain away | For most fabrics, enhanced stain removal |
| Cold wash | For most fabrics, including cotton, synthetics and normally soiled garments, uses only cold water |
| Perma Press | For wash-and-wear, synthetic fabrics, and lightly to normally soiled garments. |
| Sports wear | For exercise wear such as sports tops, tracksuit bottoms, T-shirts, vests and other sports clothing which are not heavily soiled. |
| Delicates | For sheer fabrics, bras, lingerie silk, and other handwash-only fabrics. |
| Wool | For machine washable woollens |
| Speed wash | Lightly soiled garments needed quickly |
| Rinse & Spin | Garments that need only rinsing optionally with fabric enhancer. |

In some embodiments, the wash cycle may be selected by selecting the name of the wash. In some embodiments, the wash cycle may be selected based primarily on a selection of garment type, for instance those in Table 2 above. For instance, the user may be presented with garment options e.g. school uniform, shirts, socks, underwear, sports wear, towels, bedding, delicates, woollens, and the method may select the best cycle according to the types of garment inputted.

The method and washing machine of the invention adjust a subset of wash cycle parameters responsive to the feedback to improve the results of subsequent washes. For instance, when the user indicates that clothes lack sufficient fragrance, the number of intermediate rinses (IN1) may be reduced and/or the final rinse overall filling level may be reduced (FF1). The remedial action taken by the method and washing machine may be in accordance with a plurality of rules that may be pre-defined and that may be correlated. The rules may be stored in a rule database present in the washing machine. Each rule links one or more wash parameters with one or more feedback parameters. In particular, each rule links the value of the feedback (e.g. positive or negative) parameter with the direction of the change to the wash parameter (e.g. reduction, increase, implement, do not implement). An exemplary set of rules is given in Table 3 below.

the consequence information might inform the user that, as a consequence of the feedback of stain removal, the cycle length and energy consumption will be increased. Consequence information may comprise one or more feedback parameters each having a value. The method may receive an acceptance of the consequences (from the user), in which case the adjusted wash cycle parameters are used in the subsequent wash. The method may receive an indication that the consequences are not accepted and a further feedback is received, in which case a further adjustment to the set of wash cycle parameters is applied. The further adjustment (e.g. lower the energy consumption) would further adjust the subset of wash cycle parameters according to the relevant rules. The steps of outputting consequences and receiving further feedback may be repeated as necessary, ideally until the user is satisfied with the consequences. The consequences may be calculated from a relationship table as exemplified in Table 4 and detailed later below.

In some embodiments, the method presents the user with a selectable list of cycle feedback parameters each having an

TABLE 3

Examples of rules for adjusting a subset of a wash cycle parameters responsive to user feedback.

| RULE | FEEDBACK | COMMENTS | WASH CYCLE PARAMETER |
|---|---|---|---|
| 1 | Fragrance | Clothes lack fragrance or have malodour | IN1(↓), FF1(↓), FF2(↑) |
| 2 | Stain removal | Insufficient stain removal | PF2(↑), MF2(↑), IF2(↑), FF2(↑), PF2(↑), MF2(↑), PA1(↑), PA2(↑), PA3(↑), PA4(↑), PA5(↑), MA1(↑), MA2(↑), MA3(↑), MA4(↑), MA5(↑), PF2(↑), MF2(↑), IF2(↑), MF4 (add) |
| 3 | Residue | Detergent residues on clothes | IN1(↑), IA2(↑), FA1(↑), FA3(↓), FA4(↓) |
| 4 | Whiteness | Insufficient whiteness | MA2(↑), IN1(↑), IF1(↑), MF3(white) |
| 5 | Ironability | Clothes too wrinkled | FS1(↓), FS2(↓), FR1(↑) |
| 6 | Wetness | Clothes too wet | FS1(↑), FS2(↑) |
| 7 | Cycle length | Cycle length too long | PF1(↓), PA1(↓), PD1(↓), PS1(↓), MF1(↓), MA1(↓), MD1(↓), MS1(↓), IF1(↓), IA1(↓), ID1(↓), IS1(↓), FF1(↓), FA1(↓), FD1(↓), FS1(↓), IN1(↓) |
| 8 | Colours | Fading colours | MA1(↓), MA2(↓), MA3(↓), MA4(↓), MF1(↓), MF3(colours) |
| 9 | Care | Clothes damaged | PA2(↓), PA3(↓), MA2(↓), MA3(↓) |
| 10 | Energy consumption | Too much energy consumed by cycle | PA2(↓), MA2(↓), IA2(↓), FA2(↓), IN1(↓), PA1(↓), PA2(↓), PA3(↓), PA4(↓), PA5(↓), MA1(↓), MA2(↓), MA3(↓), MA4(↓), MA5(↓) |
| 11 | Water consumption | Too much water consumed by cycle | PF1(↓), MF1(↓), IF1(↓), FF1(↓) |

The symbol "(↓)" refers to a decrease, the symbol (↑) refers to an increase.

If no feedback is given, the wash cycle parameters may be the ones used for the previous cycle of the same type (e.g. "normal" cycle). Maximum and minimum values of the wash cycle parameters may be dictated according to the cycle selected by the user. Maximum and minimum values of the wash cycle parameters may be modified with the limited of the selected cycle according to cycle preference information (see below) received from the user. The new wash cycle parameters may be stored in a memory for the subsequent wash, optionally as a customised wash cycle, as described below.

As mentioned above, the method may output information (to the user) concerning consequences of the adjustments to the subset of the set of wash cycle parameters. For instance, initial value (consequence information), the initial values determined according to the previous feedback. In other words, the method may output consequence information regarding consequences of said adjusting the subset of wash parameters responsive to the earlier feedback. The consequence information comprises at least some of the one or more feedback parameters and a value assigned to each feedback parameter.

The method may receive a new value (inputted by the user) for one or more of the cycle feedback parameters. In other words, the method may receive "further feedback" responsive to the consequence information. The further feedback may comprise a new inputted value of a feedback parameter of the consequence information. Typically the further feedback comprises an adjustment (by the user) to the value of a feedback parameter of the consequence information. The further feedback value may be quantitative (e.g. on a scale of 1 to 10).

It is an aspect that the "feedback" of the method may be qualitative feedback (for example, satisfactory/unsatisfactory fragrance), and the "further feedback" of the method may be quantitative feedback (for example, cleanliness evaluated on a scale from 1 to 10).

After receiving (from the user) an input of one value (further feedback), the method may calculate one or more other values of the feedback parameters using a relationship formula, and present them to the user as an updated consequence of the selection. In other words, the method may further comprise the step of updating the consequence information and outputting it to the user, after the step of receiving further feedback responsive to the consequence information. The inputting of further feedback and outputting of updated consequences may be repeated at least once e.g. in a loop (e.g. FIG. 3, 226). A readjustment of the subset of the set of wash cycle parameters responsive to the further feedback may arise prior to outputting of updated consequences (e.g. FIG. 3, 226'). The loop ends when the user is satisfied with the consequences.

One or more of the feedback parameters of the consequence information may be an implicit or explicit indication of dissatisfaction. One or more of the feedback parameters of the consequence information may include stain removal, fragrance, residue, whiteness, ironability, wetness, length of cycle, colour fading, care, energy consumption or water consumption. One of the feedback parameters of the consequence information may be energy or water consumption or cycle length. One of the feedback parameters of the consequence information may be energy or water consumption. One of the feedback parameters of the consequence information may be concern machine consumption (e.g. energy or water consumption or cycle length), and another of the feedback parameters of the consequence information may relate to a laundered garment characteristic (e.g. stain removal, fragrance, residue, whiteness, ironability, wetness, colour fading, care).

The consequence information may be determined using a set of relationship formulas each relationship linking to a feedback parameter to another feedback parameter. The relationship formula may be integrated into the aforementioned rules. The selection and display may be dynamic. In a preferred embodiment each feedback parameter in the selectable list parameters is provided as a linear or rotary adjustable dial, wherein the movements of at least two dials are synchronised. The GUI module may be adapted to provide such an adjustable dial. By synchronised it is meant that the adjustable dials (for example sliders) move together, but not necessarily to the same degree. For example, when the cycle length slider is moved to shorten the cycle, the stain removal slider may show a simultaneous decrease in stain removal. Movement of one adjustable dial by the user results in a movement of the synchronised dials according to the relationship formula. Accordingly, the consequence information may be outputted to a graphical user interface module wherein each feedback parameter thereof is an adjustable dial indicating the value of the feedback parameter, the further feedback may be received by adjustment of one or more of the adjustable dials, and at least two dials may be synchronised, such that an indication of the value of a second dial changes responsive to an input of an adjustment to a first dial. Some examples of relationships are provided in Table 4 below. Not all relationships will necessarily occur, since they may depend on which wash cycle parameters are adjusted.

TABLE 4

Examples of relationships between some feedback parameters. The relationships may be integrated into the rules.

| FEEDBACK PARAMETER | CODE | RELATIONSHIP |
| --- | --- | --- |
| Cycle length | Len | Len ∝ Stn |
| Stain removal | Stn | Stn ∝ Len |
|  |  | Stn ∝ WCn |
|  |  | Stn ∝ ECn |
|  |  | Stn ∝ Cre$^{-1}$ |
| Care | Cre | Cre ∝ Stn$^{-1}$ |
| Energy consumption | ECn | ECn ∝ Stn |
|  |  | ECn ∝ Wtp |
| Water consumption | WCn | WCn ∝ Stn |
| Wash temperature | Wtp | Stn ∝ Wtp |

Based on the feedback parameters (optionally selected from Table 4), a subset of wash cycle parameters (optionally selected from Table 1) may be adjusted according to the rules of Table 3. For example, reducing cycle length Len, may result in a reduction of one or more overall time/water level parameters PF1, PA1, PD1, PS1, MF1, MA1, MD1, MS1, IF1, IA1, ID1, IS1, FF1, FA1, FD1, and FS1. In some embodiments, reducing cycle length Len results in a reduction of number of rinses IN1. In another example, increasing stain removal Stn, may result in an increase of one or more detergent quantity parameters PF2, MF2, IF2, and FF2, preferably PF2 and MF2, and/or in an increase of one or more agitation parameters PA1, PA2, PA3, PA4, PA5, MA1, MA2, MA3, MA4, and MA5, and/or a change in one or more the detergent type parameters PF3, MF3, IF3, and a change in the laundry additive parameter MF4. In another example, increasing degree of care Cre, may result in an decrease of one or more agitation parameters PA2, PA3, MA2, MA3. In another example, reducing energy consumption Con, may result in an decrease of one or more temperature parameters PA2, MA2, IA2, FA2 and in a decrease of one or more agitation parameters In some embodiments, reducing energy consumption Con results in a reduction of number of rinses IN1. In another example, reducing water consumption Wat, may result in an decrease of one or more fill level parameters PF1, MF1, IF1, and FF1. In some embodiments, reducing water consumption Wat results in a reduction of number of rinses IN1.

The present invention allows the user to interact with the washing machine via feedback and consequences, and at the same time determine a predicted internal state of the washing machine, allowing informed decision in balancing machine consumption (internal state) and wash quality of the garments. Previously, the user has been protected from information relating to the internal operation of a washing machine, whereas the instant method presents it to the user and allows adjustment leading to an improved wash cycle that satisfies laundering quality with environmental and efficiency concerns.

Prior to starting the wash cycle, the method or washing machine of the invention may receive cycle preference information from the user. The method then adjusts one or more wash cycle parameters responsive to the cycle preference information. The cycle preference information may comprise one or more cycle preference parameters from the group comprising cycle length, stain removal, degree of care, energy consumption, water consumption, and wash water temperature.

The cycle preference information may include an indication of a value of one or more of the cycle preference parameters. The user-selected cycle preference parameters and optionally selected values thereof may be constraints that override previous feedback information. The user-selected cycle preference parameters and optionally selected values thereof may be over-riding constraints for the selected wash cycle within limits set by the selected wash cycle. For instance, should the user select a low water usage, the wash will proceed with that constraint. Preferably, the one or more wash cycle parameters adjusted responsive to the cycle preference information may be contained in the subset of wash cycle parameters adjusted responsive to the feedback. In some embodiments, the one or more wash cycle parameters adjusted responsive to the cycle preference information may not be contained in the subset of wash cycle parameters adjusted responsive to the feedback.

In some embodiments, the method presents the user with a selectable list of cycle preference parameters from which the user can indicate a value for one or more of the cycle preference parameters. After receiving an input of one value, the method may calculate one or more other values of the cycle preference parameters using a relationship formula, and present them to the user. The relationship formula may be integrated into the aforementioned rules. The selection and display may be dynamic. In a preferred embodiment each cycle preference parameter in the selectable list parameters is provided as a linear or rotary adjustable dial, wherein the movements of at least two dials are synchronised. The GUI module is adapted to provide such a rotary dial. By synchronised it is meant that the adjustable dials (for example sliders) move together, but not necessarily to the same degree. For example, when the cycle length slider is moved to shorten the cycle, the cleanliness slider may show a simultaneous decrease in cleanliness. Movement of one adjustable dial by the user results in a movement of the synchronised dials according to the relationship formula. Some examples of relationships are provided in Table 5 below. Not all relationships will necessarily occur, since they may depend on which wash cycle parameters are adjusted.

TABLE 5

Examples of relationships between some cycle preference parameters.

| FEEDBACK PARAMETER | CODE | RELATIONSHIP |
| --- | --- | --- |
| Cycle length | Len | Len $\propto$ Stn |
| Stain removal | Stn | Stn $\propto$ Len |
|  |  | Stn $\propto$ WCn |
|  |  | Stn $\propto$ ECn |
|  |  | Stn $\propto$ Cre$^{-1}$ |

TABLE 5-continued

Examples of relationships between some cycle preference parameters.

| FEEDBACK PARAMETER | CODE | RELATIONSHIP |
| --- | --- | --- |
| Care | Cre | Cre $\propto$ Stn$^{-1}$ |
| Energy consumption | ECn | ECn $\propto$ Stn |
|  |  | ECn $\propto$ Wtp |
| Water consumption | WCn | WCn $\propto$ Stn |
| Wash temperature | Wtp | Stn $\propto$ Wtp |

Maximum and minimum values of the wash cycle parameters may be dictated according to the cycle selected by the user. One or more maximum and minimum values of the wash cycle parameters may be modified according to the cycle preference information.

Based on the cycle preference parameters (optionally selected from Table 5), a subset of wash cycle parameters (optionally selected from Table 1) may be adjusted. For example, reducing cycle length Len, may result in a reduction of one or more overall time/water level parameters PF1, PA1, PD1, PS1, MF1, MA1, MD1, MS1, IF1, IA1, ID1, IS1, FF1, FA1, FD1, and FS1. In some embodiments, reducing cycle length Len results in a reduction of number of rinses IN1. In another example, increasing stain removal Stn, may result in an increase of one or more detergent quantity parameters PF2, MF2, IF2, and FF2, preferably PF2 and MF2, and/or in an increase of one or more agitation parameters PA1, PA2, PA3, PA4, PA5, MA1, MA2, MA3, MA4, and MA5, and/or a change in one or more the detergent type parameters PF3, MF3, IF3, and a change in the laundry additive parameter MF4. In another example, increasing degree of care Cre, may result in an decrease of one or more agitation parameters PA2, PA3, MA2, MA3. In another example, reducing energy consumption Con, may result in an decrease of one or more temperature parameters PA2, MA2, IA2, FA2 and in a decrease of one or more agitation parameters In some embodiments, reducing energy consumption Con results in a reduction of number of rinses IN1. In another example, reducing water consumption Wat, may result in an decrease of one or more fill level parameters PF1, MF1, IF1, and FF1. In some embodiments, reducing water consumption Wat results in a reduction of number of rinses IN1.

In some embodiments, the methods provide the user with guidance information responsive to the feedback. For instance, if the user provides feedback that there is insufficient fragrance, the guidance information might contain a message to add additional rinse added product (e.g. fabric conditioner) or to use a laundry additive in the main wash (e.g. scent booster). The guidance information may be textual, spoken, graphic, oral, or any in the form of any human perceivable information. The guidance information may be implemented by extending the rules to include the text of the appropriate message. An example of rules incorporating guidance information is provided in Table 6.

TABLE 6

Examples of rules of Table 3, extended to include guidance information.

| RULE | FEEDBACK | WASH CYCLE PARAMETER | GUIDANCE INFORMATION |
| --- | --- | --- | --- |
| 1 | Fragrance | FN ($\downarrow$), FF1($\downarrow$), FF2($\uparrow$) | "Use more rinse added product", "Use scent booster" |
| 2 | Stain removal | PF2($\uparrow$), MF2($\uparrow$), IF2($\uparrow$), FF2($\uparrow$), PF2($\uparrow$), MF2($\uparrow$), PA1($\uparrow$), PA2($\uparrow$), PA3($\uparrow$), PA4($\uparrow$), PA5($\uparrow$), MA1($\uparrow$), MA2($\uparrow$), | "Use more detergent", "Use Stain Remover Booster" |

TABLE 6-continued

Examples of rules of Table 3, extended to include guidance information.

| RULE | FEEDBACK | WASH CYCLE PARAMETER | GUIDANCE INFORMATION |
|---|---|---|---|
| 3 | Residue | MA3(↑), MA4(↑), MA5(↑), PF2(↑), MF2(↑), IF2 (↑), MF4 (add) IN1(↑), IA2(↑), FA1(↑), FA3(↓), FA4(↓) | "Use liquid detergent" |
| 4 | Whiteness | MA2(↑), IN1(↑), IF1(↑), MF3(white) | "Use 'Whites' detergent" |
| 5 | Ironability | FS1(↓,), FS2(↓), FR1(↑) | "Reduce load" |
| 6 | Wetness | FS1(↑), FS2(↑) | "Reduce load" |
| 7 | Cycle length | PF1(↓), PA1(↓), PD1(↓), PS1(↓), MF1(↓), MA1(↓), MD1(↓), MS1(↓), IF1(↓), IA1(↓), ID1(↓), IS1(↓), FF1(↓), FA1(↓), FD1(↓), FS1(↓), IN1(↓) | — |
| 8 | Colours | MA1(↓), MA2(↓), MA3(↓), MA4(↓), MF1(↑), MF3(colours) | "Use 'Colours' detergent" |
| 9 | Care | PA2(↓), PA3(↓), MA2(↓), MA3(↓) | — |
| 10 | Energy consumption | PA2(↓), MA2(↓), IA2(↓), FA2(↓), IN1(↓), PA1(↓), PA2(↓), PA3(↓), PA4(↓), PA5(↓), MA1(↓), MA2(↓), MA3(↓), MA4(↓), MA5(↓) | — |
| 11 | Water consumption | PF1(↓), MF1(↓), IF1(↓), FF1(↓) | — |

In some circumstances, the guidance information is an instruction to adjust a wash cycle parameter that the washing machine cannot automatically adjust. For instance, when the washing machine is not disposed with storage reservoirs for detergents, laundry additive and rinse added product(s), the corresponding wash cycle parameters (PF2, PF3, MF2, MF3, IF2, IF3/MF4/FF2)) may be adjusted by instruction of the user. In the case of Rule 1, for instance, where FF2(↑), the method may output an instruction (e.g. guidance information) to add more rinse added product.

The method may further adjust one or more wash cycle parameters responsive to one or more sensors in the washing machine. The one or more sensors may be used to measure one or more sensor parameters from the group comprising but not limited to: load weight, load absorbency, water volume to wet load, heat up rate, foam generation, rinse quality (for example through optical or conductive measurements), and waste water turbidity.

In some embodiments, the washing machine comprises a sensor to measure the load (or weight) of the batch of laundry. Certain wash cycle parameters may be further adapted based on the measured load. For example, when a light load of laundry is detected, the method may comprise reduction of one or more of spin parameters PS1, PS2, MS1, MS2, IS1, IS2, FS1, and FS2.

In some embodiments, the washing machine comprises a sensor to measure turbidity of the water drained during one or more of the washing stages. Certain wash cycle parameters may be further adapted based on the measured turbidity. For example, when a high turbidity is detected, the method may comprise an increase of one or more of detergent quantity parameters PF2, MF2, IF2, FF2, preferably PF2 and/or MF2, and/or an increase in one or more filling level parameters PF1, MF1, IF1, and FF1, and/or an increase in one or more agitation parameters PA1, PA2, PA3, PA4, PA5, MA1, MA2, MA3, MA4, and MA5.

The method and washing machine of the invention may provide feedback information by a graphical user interface (GUI) module. Typically the graphical user interface module comprises a display screen adapted to display information, for instance a plurality of choices (e.g. feedback parameters, cycle preference parameters) and an input device to receive a selection of one or more choice, optionally with an indication of a value. The display screen may be any, for instance, a liquid-crystal (LCD) screen or an organic liquid-crystal (OLED) screen. The input device such as a trackpad, click wheel, one or more buttons, or a touch sensitive layer disposed over the display screen. The skilled person would be able to construct a GUI module using known methods and materials.

The graphical user interface module may be integrated into the washing machine, for instance, disposed on a facia. The graphical user interface module may be comprised in a connected device. A connected device refers to a separate computer that is capable of being connected to the Internet. A connected device may be a device configured to connect wirelessly to the washing machine such as a smartphone (e.g. an iPhone or an Android, Windows), a tablet, a laptop, and the like. Typically the connected device is disposed with a touch sensitive screen, and is configured to convey information between the washing machine and use. The connected device may communicate with the washing machine using a wireless standard such as wi-fi, Bluetooth, NFC or similar. The connected device may be a remote computer. The smartphone, a tablet, phablet, a laptop, and the like may be disposed with appropriate functionality for communicating with the washing machine and providing the GUI by executing a suitable program (e.g. a software program or an app).

A washing machine as understood in the art usually comprises a drum rotatably placed in a housing. The axis or rotation of the drum is typically horizontal. The drum may be front or top loading. The drum is configured to receive laundry, such as clothing or linen and the like, therein and is disposed with a plurality of apertures for the passage of liquid, such as receiving water and detergent, and for drainage of contaminated water. Lifters may be arranged at an inner circumferential surface of the drum and serve to lift and drop clothing as the drum is rotated. The drum is typically rotated by means of a motor. Contaminated water is typically removed by means of a pump. The machine is typically provided with an electrical heating element to elevate the temperature of liquid in the drum. The washing machine is often also provided with a detergent module for receiving washing detergent and/or fabric enhancer (also known as fabric conditioner). The detergent module may be passive, such as a refillable detergent draw common on most automatic washing machines. The detergent module may be active, having one or more reservoirs for storing detergent and a dosing mechanism (e.g. a pocket ball valve). Entry of water and its directional flow into the detergent module may be controlled by one or more electrically actuated valves. The washing machine may be disposed with one or more sensors to sense the level of water in the drum, temperature, turbidity, drainage and other operational states such as the load.

In some embodiments, the user may be pleased with the results obtained by the adjusted wash cycle parameters, and may save these as a customised wash cycle. Preferably, the user can input their own name for the customised wash cycle, for example "our bed linen", "Jason's rugby kit", "Maggie's school uniform", "baby diapers", or "my delicate underwear". The wash cycle may then be presented in the list of available wash cycles using the graphical user interface (GUI) module, and may be adjusted even further using the method according to the invention.

In the following description, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements.

An exemplary washing machine (100) suitable for implementing a method of the present invention is shown in FIG. 1. A processor (102) executes a method of the invention. The processor (102) communicates with a communication unit (120) that receives user input via an integrated GUI module (122) implemented as a control panel on a facia of the washing machine (100), or a GUI module implemented in a connected device (160) such as a smartphone. The integrated GUI module (122) typically has a panel display (126) with an input device (124) such as a click-wheel or touch screen. The connected device (160) communicates with the washing machine (100) via a wireless module (128). The processor (102) is further connected to a rule database (104) which determines adjustments to the wash cycle parameters using the user feedback. The processor may be connected to a storage memory (106) such as flash memory for storing previous feedback and/or adjusted wash cycle parameters, and to one or more machine sensors (144) that may be used to determine washing load or turbidity. Instructions for controlling the washing machine (100) according to a selected cycle and adjusted cycle parameters are sent to a driver (130) that controls a draining pump (132), drum motor (134), heating element (136), and one or more flow valves (128, 140, 142).

Figure 2:
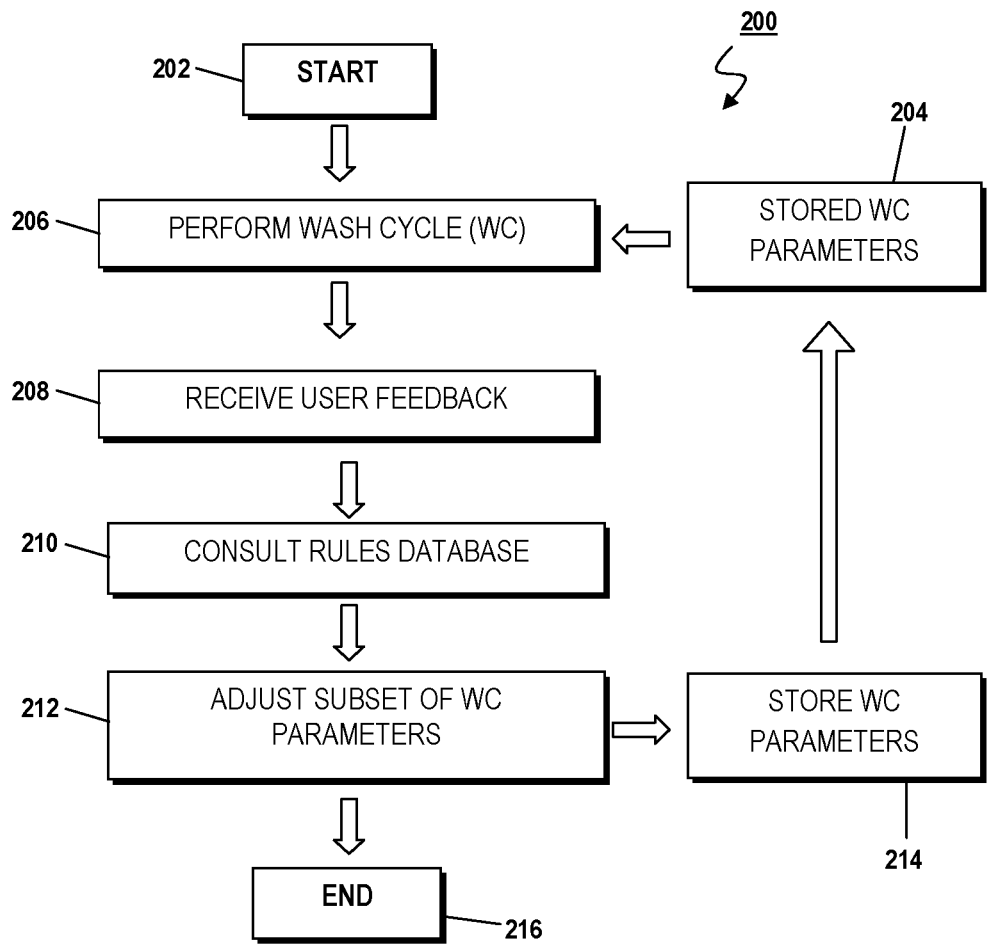
FIG. 2 depicts a work flow of a method according to an embodiment of the invention.

An exemplary workflow of a method of the invention is provided in FIG. 2. At the start (202), the user loads the washing machine with clothes and adds detergent and selects a suitable cycle. The method retrieves stored wash cycle parameters (204) and the wash cycle commences (206) based on the stored parameters. After the wash, user feedback is received (208). The method consults the rule database (210) and adjusts one or more wash cycle parameters (212) responsively. The adjusted wash cycle parameters are stored (214) for the next wash. The method may end (216) at that moment. It is appreciated that the order of the steps may be changed in accordance with the practices of the skilled person. For instance, the wash cycle parameters may be adjusted (212) prior to performing the wash cycle (206), instead of at the end of the wash cycle.

Figure 3:
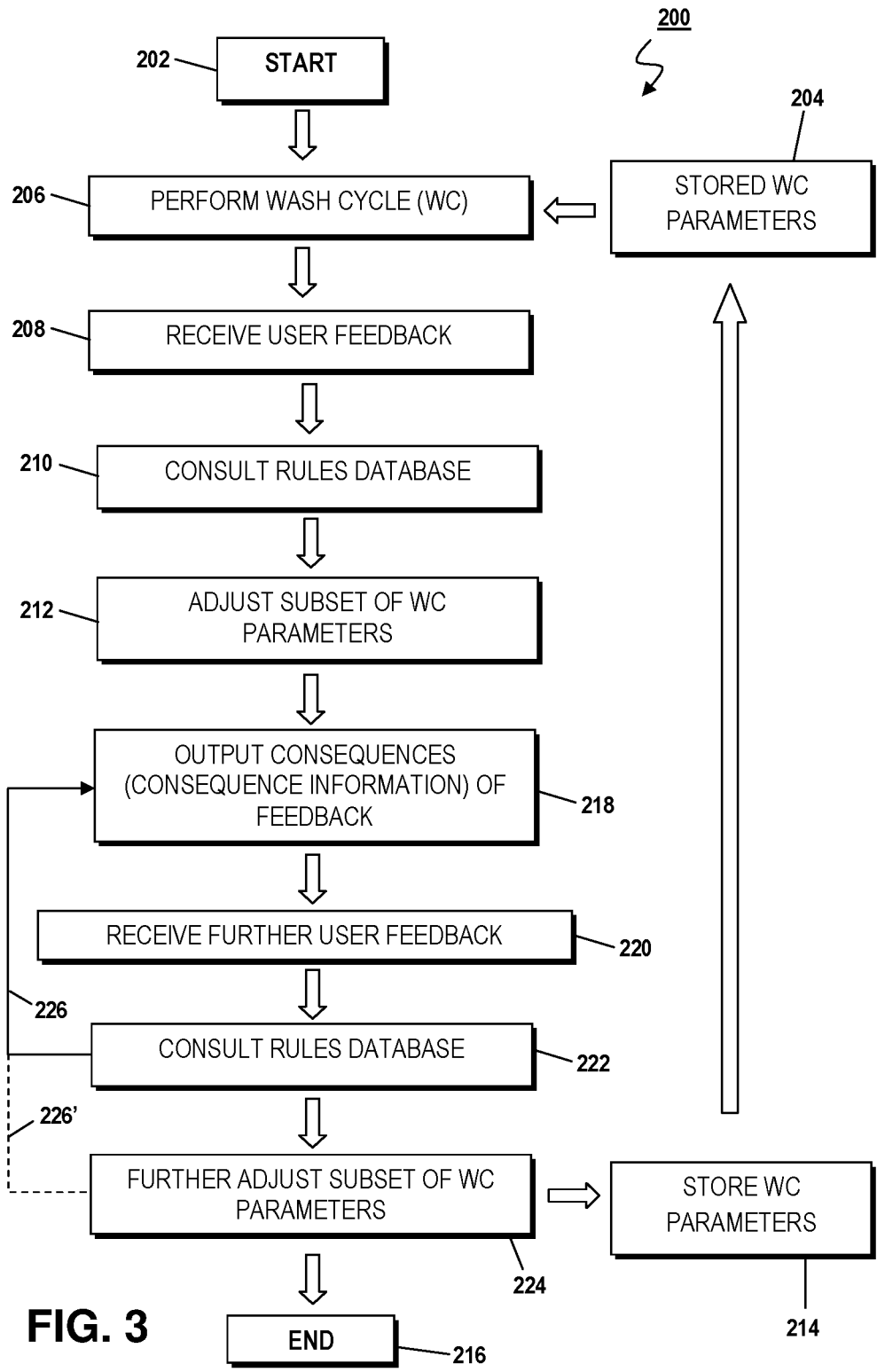
FIG. 3 depicts a work flow of a method according to an embodiment of the invention in which consequences of user feedback is presented to user, and further user feedback is provided to the method.

Another exemplary workflow is depicted in FIG. 3. At the start (202), the user loads the washing machine with clothes and adds detergent and selects a suitable cycle. The method retrieves stored wash cycle parameters (204) and the wash cycle commences (206) based on the stored parameters. After the wash, user feedback is received (208). The method consults the rule database (210) and adjusts one or more wash cycle parameters (212) responsively. The consequences of the feedback (e.g. increased energy consumption, increased water usage) are outputted to the user (218). The consequences may be calculated from relationship formulas integrated into the rules database. Further feedback is provided to the method (220). The method consults the rule database (222), updates the consequence information and outputs it to the user (226, 218). The receipt of further feedback (220) and updating/outputting of the consequence information (226, 218) may continue (226) iteratively until the user is satisfied with the consequences. It is an option that the method consults the rule database (222), further adjusts one or more wash cycle parameters (224) responsively. The outputting of consequences (218') and further adjustment of WC parameters (224) may continue (226) iteratively until the user is satisfied with the consequences. The further adjusted wash cycle parameters are stored (214) for the next wash. The method may end (216) at that moment. It is appreciated that the order of the steps may be changed in accordance with the practices of the skilled person. For instance, the wash cycle parameters may be adjusted (212) and/or the consequences of the feedback (218) provided prior to performing the wash cycle (206), instead of at the end of the wash cycle.

Figure 4:
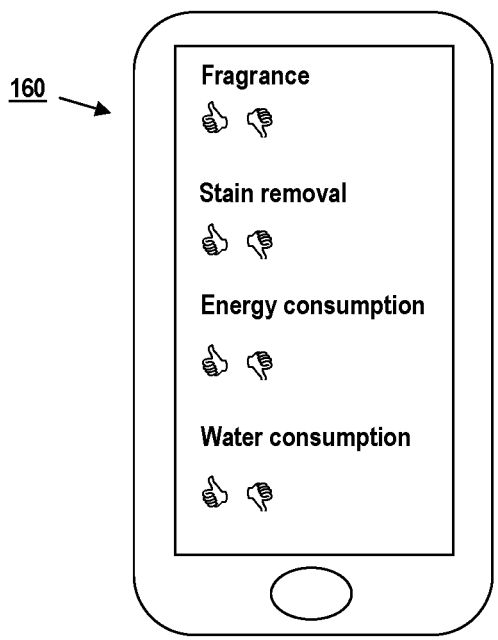
FIGS. 4, 5A and 5B show a GUI module of the invention implemented on a connected device that is a smart phone, adapted to receive one or more cycle feedback parameters.

FIG. 4 shows a GUI module of the invention implemented on a connected device (160) that is a smart phone, adapted to receive one or more feedback parameters. According to this example, feedback on fragrance, stain removal, energy consumption and water consumption can be provided by selecting "thumbs up" (satisfied) or thumbs down (dissatisfied).

Figure 5A:
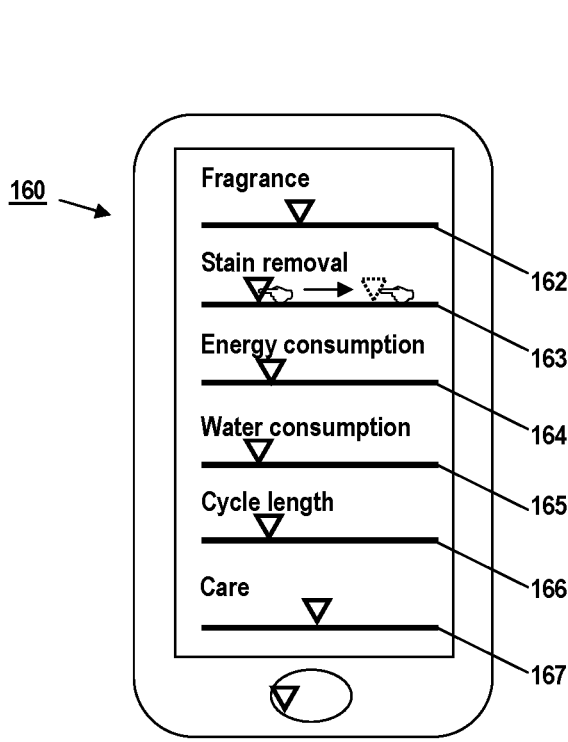
Figure 5B:
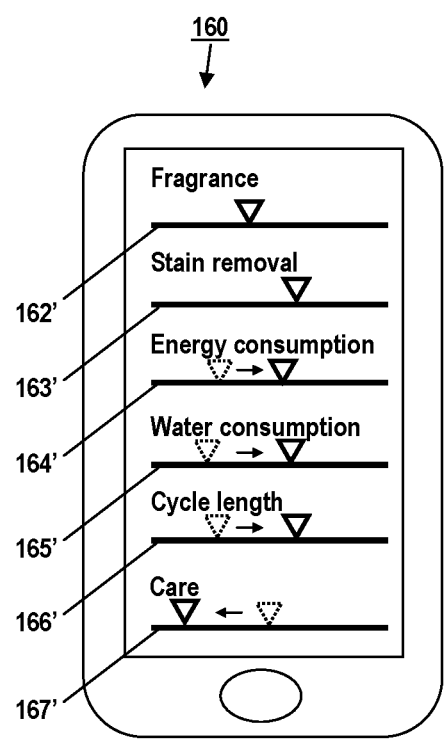

FIG. 5A shows a GUI module of the invention implemented on a connected device (160) that is a smart phone, adapted to receive one or more feedback parameters. According to this example, feedback on fragrance, stain removal, energy consumption, water consumption, cycle length, and care may be provided by sliding the linear dials (162-167). When the dial for stain removal (163, 163') is increased, the consequences of the feedback become immediately apparent in FIG. 5B when dials for energy consumption (164'), water consumption (165'), cycle length (166') synchronously increase, and the dial for care (167') synchronously decreases. The interface allows the user to provide feedback, and see the consequences of the feedback dynamically.

The present invention provides a washing machine configured to implement a method according to the invention. Preferred embodiments for the method according to the invention are also preferred embodiments for the washing machine according to the invention.

The present invention provides a module for interfacing with a washing machine, which module is configured to adapt the washing machine to implement a method according to the invention. Preferred embodiments for the method according to the invention are also preferred embodiments for the module according to the invention.

The present invention provides a computer program stored on a computer-readable medium, configured to perform a method of the invention. The present invention provides a computer program or computer program product having instructions which when executed by a computing device or system cause the computing device or system to perform a method of the invention.

The present invention provides a computer program stored on a computer-readable medium, configured to implement a graphical user interface module for providing feedback to a method of the invention. The present invention provides a computer program or computer program product having instructions which when executed by a computing device or system cause the computing device or system to provide a graphical user interface module for providing feedback to a method of the invention. The present invention provides a computer program stored on a computer-readable medium, configured to implement a graphical user interface module for providing user input to a method of the invention. Preferred embodiments for the method according to the invention are also preferred embodiments for the computer program, computer program product, computer programs stored on a computer-readable medium according to the invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A method for controlling the performance of a washing machine wash cycle using a set of wash cycle parameters, the method comprising:
   receiving feedback regarding the results of one or more previous wash cycles;
   adjusting a subset of the set of wash cycle parameters responsive to the feedback;
   outputting consequence information regarding consequences of said adjusting;
   receiving further feedback responsive to the consequence information; and
   readjusting the subset of the set of wash cycle parameters responsive to the further feedback; wherein:
   the feedback comprises input regarding one or more feedback parameters;
   the consequence information comprises at least some of the one or more feedback parameters and a value assigned to each feedback parameter; and
   the further feedback comprises an adjustment to the value of a feedback parameter of the consequence information.

2. The method according to claim 1 wherein:
   the consequence information is outputted to a graphical user interface module wherein each feedback parameter thereof is an adjustable dial indicating the value of the feedback parameter;
   the further feedback is received by adjustment of one or more of the adjustable dials; and
   at least two dials are synchronized, such that an indication of the value of a second dial changes responsive to an input of an adjustment to a first dial.

3. The method according to claim 1 wherein one or more of the feedback parameters of the consequence information include stain removal, fragrance, residue, whiteness, ironability, wetness, length of cycle, colour fading, care, energy consumption or water consumption.

4. The method according to claim 1 wherein one of the feedback parameters of the consequence information is energy consumption or water consumption or cycle length.

5. The method according to claim 1 wherein one of the feedback parameters of the consequence information is energy consumption or water consumption or cycle length and another of the feedback parameters of the consequence information is stain removal or fragrance or residue or whiteness or ironability or wetness or color fading, or care.

6. The method according to claim 1, wherein the subset of wash cycle parameters and the adjustment thereof are determined using a set of rules, each rule linking one or more wash cycle parameters with one or more feedback parameters, and the consequence information is determined using a set of relationship formulas each relationship linking to a feedback parameter to another feedback parameter.

* * * * *